(12) United States Patent
Dyer

(10) Patent No.: US 10,699,297 B2
(45) Date of Patent: Jun. 30, 2020

(54) METHOD, SYSTEM AND SOFTWARE PRODUCT FOR OPTIMIZING THE DELIVERY OF CONTENT TO A CANDIDATE

(75) Inventor: Benjamin Donald Dyer, Melbourne (AU)

(73) Assignee: TAGUCHIMARKETING PTY LTD, Victoria (AU)

(*) Notice: Subject to any disclaimer, the term of this patent is extended or adjusted under 35 U.S.C. 154(b) by 813 days.

(21) Appl. No.: 12/171,387

(22) Filed: Jul. 11, 2008

(65) Prior Publication Data
US 2010/0010865 A1    Jan. 14, 2010

(51) Int. Cl.
*G06Q 30/02* (2012.01)
*G06F 16/335* (2019.01)
(Continued)

(52) U.S. Cl.
CPC ....... *G06Q 30/0254* (2013.01); *G06F 16/335* (2019.01); *G06F 16/337* (2019.01);
(Continued)

(58) Field of Classification Search
CPC ................ G06Q 30/02; G06Q 30/0254; G06F 16/3326; G06F 16/335
(Continued)

(56) References Cited

U.S. PATENT DOCUMENTS 6,493,637 B1 * 12/2002 Steeg ............................. 702/19
6,594,557 B1 *  7/2003 Stefan et al. ..................... 701/1
(Continued)

OTHER PUBLICATIONS

"A robust design approach for enhancing the feeling quality of a product: a car profile case study", Hh Lai, Ym Chang . . .—International Journal of Industrial . . . , 2005—Elsevier.*
(Continued)

*Primary Examiner* — Jonathan G Sterrett
(74) *Attorney, Agent, or Firm* — Jon E. Gordon; Haug Partners LLP

(57) ABSTRACT

A computer-implemented method and system for improving recipient response rates to content presented via a data communications network to a plurality of recipients based upon recipient response data, wherein the content comprises a plurality of content factors. Each content factor is selected from one or more corresponding content levels. A data structure is provided for containing recipient response data associated with content comprising combinations of content levels. A plurality of content samples is generated by forming combinations of content levels for a plurality of content factors in accordance with respective combination weightings derived from recipient response data contained within the data structure. The plurality of content samples is presented to a corresponding plurality of recipients via the data communications network. The recipient responses to the content samples are received via the data communications network. The recipient responses are analysed to identify one or more combinations of content levels resulting in high recipient response rates relative to other combinations in accordance with predetermined statistical criteria. The recipient response data associated with combinations of content levels resulting in high recipient response rates is stored within the data structure.

22 Claims, 13 Drawing Sheets

(51) Int. Cl.
G06F 16/332 (2019.01)
G06F 16/9535 (2019.01)

(52) U.S. Cl.
CPC ...... G06F 16/3326 (2019.01); G06F 16/9535 (2019.01); G06Q 30/02 (2013.01); G06Q 30/0253 (2013.01)

(58) Field of Classification Search
USPC ....................................................... 705/7.29
See application file for complete search history.

(56) References Cited

U.S. PATENT DOCUMENTS

| | | | |
|---|---|---|---|
| 7,260,551 | B2 | 8/2007 | Phillips |
| 7,451,065 | B2* | 11/2008 | Pednault et al. ................... 703/2 |
| 7,542,918 | B2* | 6/2009 | Rolleston Phillips ....... 705/7.28 |
| 7,729,942 | B2* | 6/2010 | Jensen et al. ............... 705/14.52 |
| 7,949,561 | B2* | 5/2011 | Briggs ........................... 705/14.41 |
| 2003/0074142 | A1* | 4/2003 | Steeg .............................. 702/19 |
| 2003/0176931 | A1* | 9/2003 | Pednault et al. ................ 700/31 |
| 2004/0123247 | A1* | 6/2004 | Wachen et al. ............... 715/530 |
| 2005/0058074 | A1* | 3/2005 | Newman ....................... 370/241 |
| 2006/0041480 | A1* | 2/2006 | Briggs ............................ 705/14 |
| 2008/0065476 | A1* | 3/2008 | Klein et al. .................... 705/14 |
| 2008/0082411 | A1* | 4/2008 | Jensen et al. ................... 705/14 |
| 2008/0097829 | A1* | 4/2008 | Ritter ............................ 705/10 |
| 2008/0126290 | A1* | 5/2008 | Klein et al. .................... 706/60 |
| 2009/0030864 | A1* | 1/2009 | Pednault et al. ................ 706/45 |
| 2010/0049679 | A1* | 2/2010 | Phillips ............................ 706/15 |

OTHER PUBLICATIONS

Experimental design in direct mail and the application of Taguchi methods PD Berger . . .—Journal of Direct Marketing, 1993—Elsevier.*

Failure Avoidance and Robust Design: Quality Tools in Market Research [PDF] from massey.ac.nz DH Meyer . . .—Marketing Bulletin—. . . , 1996—marketing-bulletin.massey.ac.nz.*

[PDF] Robust quality [PDF] from uchile.cl G Taguchi . . .—Harvard Business Review, 1990—mazinger.sisib.uchile.cl.*

A model and solution method for multi-period sales promotion design SK Nair . . .—European Journal of Operational Research, 2003—Elsevier.*

An approach to decision-based design with discrete choice analysis for demand modeling HJ Wassenaar, W Chen—Journal of Mechanical Design, 2003—link.aip.org.*

A/B testing—Wikipedia, the free encyclopedia, retrieved from the web Oct. 5, 2013, pp. 1-3.*

"I think I can—Taguchi® Digital Marketing System", retrieved from the web on Apr. 7, 2015 from http://www.taguchimail.com/pdf/Taguchi_Web_Brochure.pdf.*

TaguchiMail Implements StrongView as Technology Platform for Delivering Email Services, Jun. 16, 2008, retrieved fromhttp://www.strongview.com/about/news-and-events/press-releases/2008/press_061608.*

"Wysk, R. A., Niebel, B. W., Cohen, P. H., and Simpson, T. W.", Manufacturing Processes: Integrated Product and Process Design, McGraw Hill, New York, 2000.(excerpt).*

"IV.4 Signal-to-Noise Ratios", The Center for Reliabilty and Quality Sciences, Department of Statistics, The University of South Carolina, ©Copyright 1997 D. Edwards, J. Grego and J. Lynch. All Rights Reserved. people.stat.sc.edu/grego/courses/stat506/Lecture.notes/L23_2.ppt.*

León, R V; Shoemaker, A C; Kacker, R N (1987). "Performance measures independent of adjustment: an explanation and extension of Taguchi's signal-to-noise ratios (with discussion)". Technometrics 29: 253-285. (Abstract Only).* https://en.wikipedia.org/wiki/Taguchi_methods, retrieved from the web on Mar. 29, 2016.*

* cited by examiner

| Subject | Title | Image | Footer | Recipients in Stage 1 | Responses from recipients in Stage 1 |
|---|---|---|---|---|---|
| Subject 1 | Title 1 | Image 1 | Footer 1 | 551 | 19 |
| Subject 1 | Title 1 | Image 2 | Footer 1 | 558 | 17 |
| Subject 1 | Title 1 | Image 3 | Footer 1 | 540 | 20 |
| Subject 1 | Title 2 | Image 1 | Footer 1 | 556 | 18 |
| Subject 1 | Title 2 | Image 2 | Footer 1 | 553 | 15 |
| Subject 1 | Title 2 | Image 3 | Footer 1 | 562 | 16 |
| Subject 2 | Title 1 | Image 1 | Footer 1 | 553 | 19 |
| Subject 2 | Title 1 | Image 2 | Footer 1 | 551 | 16 |
| Subject 2 | Title 1 | Image 3 | Footer 1 | 558 | 23 |
| Subject 2 | Title 2 | Image 1 | Footer 1 | 561 | 15 |
| Subject 2 | Title 2 | Image 2 | Footer 1 | 554 | 14 |
| Subject 2 | Title 2 | Image 3 | Footer 1 | 553 | 16 |
| Subject 3 | Title 1 | Image 1 | Footer 1 | 562 | 17 |
| Subject 3 | Title 1 | Image 2 | Footer 1 | 559 | 17 |
| Subject 3 | Title 1 | Image 3 | Footer 1 | 551 | 25 |
| Subject 3 | Title 2 | Image 1 | Footer 1 | 565 | 17 |
| Subject 3 | Title 2 | Image 2 | Footer 1 | 557 | 14 |
| Subject 3 | Title 2 | Image 3 | Footer 1 | 556 | 16 |

*FIG. 12*

| Level | Recipients in Stage 1 | Responses from recipients in Stage 1 | Response rate in Stage 1 |
|---|---|---|---|
| Subject 1 | 3320 | 105 | 3.16% |
| Subject 2 | 3330 | 103 | 3.09% |
| Subject 3 | 3350 | 106 | 3.16% |
| Title 1 | 4983 | 173 | 3.47% |
| Title 2 | 5017 | 141 | 2.81% |
| Image 1 | 3348 | 105 | 3.14% |
| Image 2 | 3332 | 93 | 2.79% |
| Image 3 | 3320 | 116 | 3.49% |

*FIG. 13*

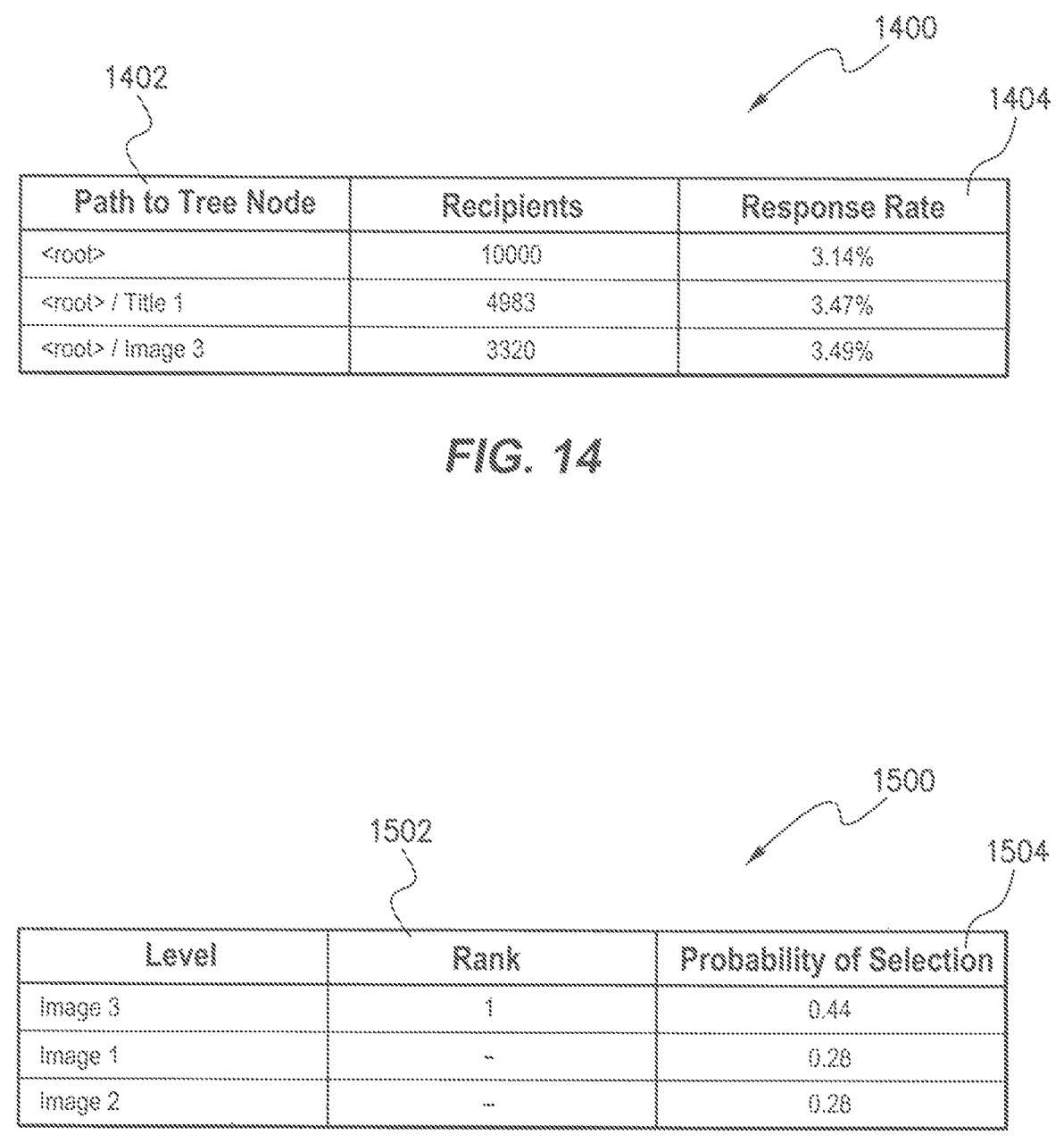

| Path to Tree Node | Recipients | Response Rate |
|---|---|---|
| <root> | 10000 | 3.14% |
| <root> / Title 1 | 4983 | 3.47% |
| <root> / Image 3 | 3320 | 3.49% |

FIG. 14

| Level | Rank | Probability of Selection |
|---|---|---|
| Image 3 | 1 | 0.44 |
| Image 1 | -- | 0.28 |
| Image 2 | -- | 0.28 |

FIG. 15

| Subject | Title | Image | Footer | Proportion of recipients in Stage 2 |
|---|---|---|---|---|
| Subject 1 | Title 1 | Image 1 | Footer 1 | 5.88% |
| Subject 1 | Title 1 | Image 2 | Footer 1 | 5.88% |
| Subject 1 | Title 1 | Image 3 | Footer 1 | 9.24% |
| Subject 1 | Title 2 | Image 1 | Footer 1 | 3.45% |
| Subject 1 | Title 2 | Image 2 | Footer 1 | 3.45% |
| Subject 1 | Title 2 | Image 3 | Footer 1 | 5.43% |
| Subject 2 | Title 1 | Image 1 | Footer 1 | 5.88% |
| Subject 2 | Title 1 | Image 2 | Footer 1 | 5.88% |
| Subject 2 | Title 1 | Image 3 | Footer 1 | 9.24% |
| Subject 2 | Title 2 | Image 1 | Footer 1 | 3.45% |
| Subject 2 | Title 2 | Image 2 | Footer 1 | 3.45% |
| Subject 2 | Title 2 | Image 3 | Footer 1 | 5.43% |
| Subject 3 | Title 1 | Image 1 | Footer 1 | 5.88% |
| Subject 3 | Title 1 | Image 2 | Footer 1 | 5.88% |
| Subject 3 | Title 1 | Image 3 | Footer 1 | 9.24% |
| Subject 3 | Title 2 | Image 1 | Footer 1 | 3.45% |
| Subject 3 | Title 2 | Image 2 | Footer 1 | 3.45% |
| Subject 3 | Title 2 | Image 3 | Footer 1 | 5.43% |

FIG. 16

| Subject | Title | Image | Footer | Recipients in Stage 2 | Responses from recipients in Stage 2 |
|---|---|---|---|---|---|
| Subject 1 | Title 1 | Image 1 | Footer 1 | 588 | 20 |
| Subject 1 | Title 1 | Image 2 | Footer 1 | 588 | 18 |
| Subject 1 | Title 1 | Image 3 | Footer 1 | 924 | 34 |
| Subject 1 | Title 2 | Image 1 | Footer 1 | 345 | 11 |
| Subject 1 | Title 2 | Image 2 | Footer 1 | 345 | 9 |
| Subject 1 | Title 2 | Image 3 | Footer 1 | 543 | 15 |
| Subject 2 | Title 1 | Image 1 | Footer 1 | 588 | 20 |
| Subject 2 | Title 1 | Image 2 | Footer 1 | 588 | 17 |
| Subject 2 | Title 1 | Image 3 | Footer 1 | 924 | 38 |
| Subject 2 | Title 2 | Image 1 | Footer 1 | 345 | 9 |
| Subject 2 | Title 2 | Image 2 | Footer 1 | 345 | 9 |
| Subject 2 | Title 2 | Image 3 | Footer 1 | 543 | 16 |
| Subject 3 | Title 1 | Image 1 | Footer 1 | 588 | 18 |
| Subject 3 | Title 1 | Image 2 | Footer 1 | 588 | 18 |
| Subject 3 | Title 1 | Image 3 | Footer 1 | 924 | 42 |
| Subject 3 | Title 2 | Image 1 | Footer 1 | 345 | 10 |
| Subject 3 | Title 2 | Image 2 | Footer 1 | 345 | 9 |
| Subject 3 | Title 2 | Image 3 | Footer 1 | 543 | 16 |

*FIG. 17*

| Level | Recipients in Stage 2 | Responses from recipients in Stage 2 | Response rate in Stage 2 |
|---|---|---|---|
| Subject 1 | 3333 | 108 | 3.25% |
| Subject 2 | 3333 | 109 | 3.27% |
| Subject 3 | 3333 | 112 | 3.37% |
| Title 1 | 6300 | 225 | 3.58% |
| Title 2 | 3700 | 104 | 2.82% |
| Image 1 | 2800 | 89 | 3.18% |
| Image 2 | 2800 | 80 | 2.84% |
| Image 3 | 4400 | 161 | 3.66% |

*FIG. 18*

| Level 1 | Level 2 | Recipients in Stage 2 | Responses from recipients in Stage 2 | Response rate in Stage 2 |
|---|---|---|---|---|
| Subject 1 | Title 1 | 2100 | 72 | 3.45% |
| Subject 1 | Title 2 | 1233 | 36 | 2.92% |
| Subject 2 | Title 1 | 2100 | 75 | 3.59% |
| Subject 2 | Title 2 | 1233 | 34 | 2.73% |
| Subject 3 | Title 1 | 2100 | 78 | 3.69% |
| Subject 3 | Title 2 | 1233 | 35 | 2.81% |
| Image 1 | Title 1 | 1764 | 58 | 3.30% |
| Image 1 | Title 2 | 1036 | 31 | 2.97% |
| Image 2 | Title 1 | 1764 | 53 | 3% |
| Image 2 | Title 2 | 1036 | 27 | 2.58% |
| Image 3 | Title 1 | 2772 | 114 | 4.12% |
| Image 3 | Title 2 | 1628 | 47 | 2.87% |
| Subject 1 | Image 1 | 933 | 31 | 3.37% |
| Subject 1 | Image 2 | 933 | 27 | 2.92% |
| Subject 1 | Image 3 | 1467 | 50 | 3.39% |
| Subject 2 | Image 1 | 933 | 29 | 3.16% |
| Subject 2 | Image 2 | 933 | 26 | 2.76% |
| Subject 2 | Image 3 | 1467 | 54 | 3.66% |
| Subject 3 | Image 1 | 933 | 28 | 3.02% |
| Subject 3 | Image 2 | 933 | 27 | 2.84% |
| Subject 3 | Image 3 | 1467 | 58 | 3.93% |

FIG. 19

| Path to Tree Node | Recipients | Response Rate |
|---|---|---|
| <root> | 10000 | 3.30% |
| <root> / Title 1 | 6300 | 3.58% |
| <root> / Image 3 | 4400 | 3.66% |
| <root> / Image 3 / Title 1 | 2772 | 4.12% |
| <root> / Image 3 / Subject 3 | 1467 | 3.93% |

FIG. 20

METHOD, SYSTEM AND SOFTWARE PRODUCT FOR OPTIMIZING THE DELIVERY OF CONTENT TO A CANDIDATE

FIELD OF THE INVENTION

The present invention relates generally to computerised information systems. In particular, the invention concerns a method and system for improving response rate to online content, based upon candidate response data and content parameters. The invention is most readily implemented on the Internet and it will therefore be convenient to describe the invention in that environment. It should be understood however that the invention may be implemented in other environments.

BACKGROUND TO THE INVENTION

Online media offer a number of advantages over traditional advertising distribution techniques; most importantly, the speed of execution and delivery, and the verifiability of content performance. However, the technical sophistication of marketing techniques has lagged behind that of the distribution and consumption mechanisms upon which they rely, and many marketers have yet to fully realise the unique benefits of the online space.

The increasing prominence of web analytics and optimisation solutions in the suite of tools offered to online marketers is a sign that techniques are becoming more sophisticated, and that the marketing community is discovering the improvements in strategy and execution attainable via constant measurement and experimentation.

The performance of online marketing campaigns (including a coordinated set of email broadcasts, website landing pages, or banner advertisements) is often tracked in terms of click-through rates (the proportion of recipients of a particular content item who click on it), and conversion rates (the proportion of recipients of a particular content item who go on to complete a target action, such as purchasing a product). In order to improve these metrics, a number of optimisation processes are used, such as A/B testing or multivariate testing. However, these optimisation methods are labour-intensive and require a considerable amount of data to be processed over the course of a marketing campaign. In addition, campaigns consisting of only a small number of touch-points or media, or those consisting of a series of very different touch-points or media, are difficult to optimize because language and images shown to perform better in previous content may not be applicable to future content, and optimization can only occur between one iteration of a campaign and a subsequent iteration with similar content and purpose.

Accordingly, several methods intended to maximise the performance of online content have been developed, and a selection of these will now be discussed.

A/B testing (otherwise known as "split testing") involves the usage of two or more mutually exclusive items of content intended to provoke the same candidate response. The success probability of each content item is based on the ratio of target action performances to content item usages, and the "winner" is the item with the highest proportion of desired actions to recipients (i.e. the "response rate"). The winning content item is then used in future marketing propositions. Although A/B testing is straightforward to understand and apply, it suffers from a number of limitations. Chief among these is the trade-off between the number of content parameters to be tested, and the accuracy of the results. For instance, if only one content parameter is altered from content item to content item, the results clearly indicate the relative performance of each selection of that parameter. Exhaustive testing of all combinations of content parameters of a complex content item one-by-one may require considerable time, and/or a very large number of samples. Conversely, varying combinations of several content parameters from content item to content item results in uncertainty regarding the true performance impact of each content parameter and selection.

Although more complex than A/B testing, multivariate testing is becoming increasingly popular and generally takes the form of either fractional-factorial testing or full-factorial testing.

Fractional-factorial testing involves the manual or automated selection of a unique subset of combinations of content items designed to reduce the number of content combinations which need to be tested, and thus the cost of the experiment is reduced. Testing on the subset of combinations is performed as in the A/B testing methodology outlined above. However, the increased depth of analysis potentially enables greater gains in response rate to be achieved. The major limitation of this testing method is that interaction effect analysis is restricted, a priori, to a set depth by the experimental design.

Full-factorial multivariate testing involves the generation of a unique, exhaustive set of combinations of content items, and an experimental methodology essentially equivalent to the A/B testing methodology outlined above. The major drawback of the full-factorial testing method is that it requires significantly more data for its results to achieve statistical significance.

There remains a need for methods and systems providing improved testing of content performance in relation to recipient response rates.

SUMMARY OF THE INVENTION

According to one aspect of the present invention there is provided a computer-implemented method for improving recipient response rates to content presented via a data communications network to a plurality of recipients based upon recipient response data, wherein the content comprises a plurality of content factors, each content factor being selected from one or more corresponding content levels, and wherein the method comprises the steps of:

a) providing a data structure for containing recipient response data associated with content comprising corresponding combinations of content levels;

b) generating a plurality of content samples by forming combinations of content levels for a plurality of content factors in accordance with respective combination weightings derived from recipient response data contained within the data structure;

c) presenting each one of the plurality of content samples to a corresponding plurality of recipients via the data communications network;

d) receiving recipient responses to the content samples via the data communications network;

e) analysing the recipient responses to identify one or more combinations of content levels resulting in high recipient response rates relative to other combinations in accordance with predetermined statistical criteria; and f) storing within the data structure recipient response data associated with said combinations of content levels resulting in high recipient response rates.

In general, embodiments of the invention store test results (recipient response data) within the data structure, and derive weightings for combinations of content levels, such that these may be used to guide further iterations of the testing process based upon incomplete data sets. Advantageously, testing may thus be focused automatically upon those combinations that emerge as being most likely to result in improved recipient response rates. Testing is thereby dynamically adaptable based upon received recipient responses, and is not restricted to experimental data sets that have been determined a priori. The preferred approach is statistical, whereby in each test stage the probability that a content sample including a particular combination of content levels will be generated increases with the response rate for that combination in previous stages.

Preferably, step (e) comprises analysing the recipient responses to calculate for each one of a plurality of combinations of content levels a corresponding probability that a recipient response rate to said combination of content levels is greater than the average response rate for all combinations of content levels. Repeating the steps (b) to (f) may be performed so as to further improve recipient response rates. It is also preferable that the step (b) of generating content samples comprises a step of ranking the content factors based upon a number of content levels corresponding with each content factor. Step (b) of generating content samples may also comprise forming a full factorial of combinations of content levels for the plurality of content factors.

Preferably the data structure comprises a tree structure. This tree structure may comprise: a root node for containing recipient response data corresponding with all content samples presented to recipients; and zero or more leaf nodes for containing recipient response data corresponding with content samples presented to recipients which comprise particular content levels and/or combinations of content levels.

Preferably, step (b) of generating content samples comprises the steps of: deriving from the tree structure partial combinations of content levels based upon a number of content levels comprising each content factor; filtering out partial combinations of content levels based upon the content levels already selected for the plurality of content factors; filtering out partial combinations of content levels for which more extended combinations of content levels exist; and selecting partial combinations of content levels based upon a weighted random distribution with the combination weightings as a parameter.

It is a preferred feature of the present invention that the step (e) of analysing the recipient responses comprises the steps of: retrieving recipient response data from the data structure and aggregating said recipient response data based upon combinations of content levels; and forming extended combinations of content levels for those combinations of content levels which have resulted in high recipient response rates relative to other combinations. The step of forming extended combinations may also comprise generating leaf nodes of the tree structure for containing recipient response data corresponding with content samples presented to recipients in a recursive manner for the extended combinations of content levels.

Preferably, each combination weighting (w) is computed based upon a probability that a recipient response rate to the corresponding combination of content levels is greater than an average recipient response rate for all combinations of content levels ($a_n$) and the number of content levels comprising each content factor (k), according to the formula:

$$w = \frac{(1-a_n)}{\sum_{i=0}^{i=k}(1-a_i)}.$$

According to a further aspect of the present invention, there is provided a computer-implemented system for improving recipient response rates to content presented via a data communications network to a plurality of recipients based upon recipient response data, wherein the content comprises a plurality of content factors, each content factor being selected from one or more corresponding content levels, the system comprising:

a) a data structure for containing recipient response data associated with content comprising corresponding combinations of content levels;

b) means for generating a plurality of content samples by forming combinations of content levels for a plurality of content factors in accordance with respective combination weightings derived from recipient response data contained within the data structure;

c) means for presenting each one of the plurality of content samples to a corresponding plurality of recipients via the data communications network;

d) means for receiving recipient responses to the content samples via the data communications network;

e) means for analysing the recipient responses to identify one or more combinations of content levels resulting in high recipient response rates relative to other combinations in accordance with predetermined statistical criteria; and f) means for storing within the data structure recipient response data associated with said combinations of content levels resulting in high recipient response rates.

According to a still further aspect of the present invention, there is provided a computer-implemented system of improving recipient response rates to content presented via a data communications network to a plurality of recipients based upon recipient response data, wherein the content comprises a plurality of content factors, each content factor being selected from one or more corresponding content levels, the system comprising one or more computers comprising:

at least one processor;

an interface between said processor and the data communications network; and one or more computer-readable storage media operatively coupled to the processor comprising a data structure for containing recipient response data associated with content comprising corresponding combinations of content levels, wherein the storage medium containing program instructions for execution by the processor, wherein the data structure is contained on at least one storage device and wherein the content factors and corresponding one or more content levels are contained on at least one storage device, said program instructions causing the processor to execute the steps of:

a) generating a plurality of content samples by forming combinations of content levels for a plurality of content factors in accordance with respective combination weightings derived from recipient response data contained within the data structure;

b) presenting each one of the plurality of content samples to a corresponding plurality of recipients via the data communications network;

c) receiving recipient responses to the content samples via the data communications network;

d) analysing the recipient responses to identify one or more combinations of content levels resulting in high recipient response rates relative to other combinations in accordance with predetermined statistical criteria; and f) storing within the data structure recipient response data associated with said combinations of content levels resulting in high recipient response rates.

According to a still further aspect of the present invention, there is provided a tangible computer-readable medium having computer-executable instructions stored thereon for performing a method of improving recipient response rates to content presented via a data communications network to a plurality of recipients based upon recipient response data, wherein the content comprises a plurality of content factors, each content factor being selected from one or more corresponding content levels, the method comprising the steps of:

a) providing a data structure for containing recipient response data associated with content comprising corresponding combinations of content levels;

b) generating a plurality of content samples by forming combinations of content levels for a plurality of content factors in accordance with respective combination weightings derived from recipient response data contained within the data structure;

c) presenting each one of the plurality of content samples to a corresponding plurality of recipients via the data communications network;

d) receiving recipient responses to the content samples via the data communications network;

e) analysing the recipient responses to identify one or more combinations of content levels resulting in high recipient response rates relative to other combinations in accordance with predetermined statistical criteria; and f) storing within the data structure recipient response data associated with said combinations of content levels resulting in high recipient response rates.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which like reference numerals refer to like features and wherein:

FIG. 12 is an example of recipient responses corresponding with the distribution illustrated in FIG. 11;

FIG. 13 is an example of recipient response data illustrated in FIG. 12 aggregated by content level;

FIG. 14 is an example of content level performance data corresponding with the test data of FIGS. 11 to 13 that is encoded into a tree structure;

FIG. 15 is an example of content levels corresponding with the test data of FIGS. 11 to 13 ranked in accordance with probability of selection;

FIG. 16 is an example of a distribution of possible combinations of content levels in a second stage of testing, according to an embodiment of the invention;

FIG. 17 is an example of recipient responses corresponding with the distribution illustrated in FIG. 16;

FIG. 18 is an example of recipient response data illustrated in FIG. 17 aggregated by content level;

FIG. 19 is an example of recipient response data illustrated in FIG. 17 aggregated by content level pairs; and FIG. 20 is an example of the content level performance data corresponding with the test data of FIGS. 16 to 19 that is encoded into a tree structure.

DESCRIPTION OF PREFERRED EMBODIMENT

A computer-implemented method of improving recipient response rates to content presented via a data communications network to a plurality of recipients in accordance with a preferred embodiment of the present invention is most readily implemented by delivery of content to recipients via email and it will therefore be convenient to describe the invention in that environment.

It should be understood that the invention is not limited to this preferred embodiment. In an alternative embodiment of the present invention the delivery of content to recipients may be facilitated by web servers which allow the user of a terminal to access a dynamic web-based service. A service of this nature would facilitate the delivery of content to users, and allow for the calculation of response rates to said content. Advantageously, the content would be delivered to users by accessing a webpage at a predefined Uniform Resource Locator (URL).

Figure 1:
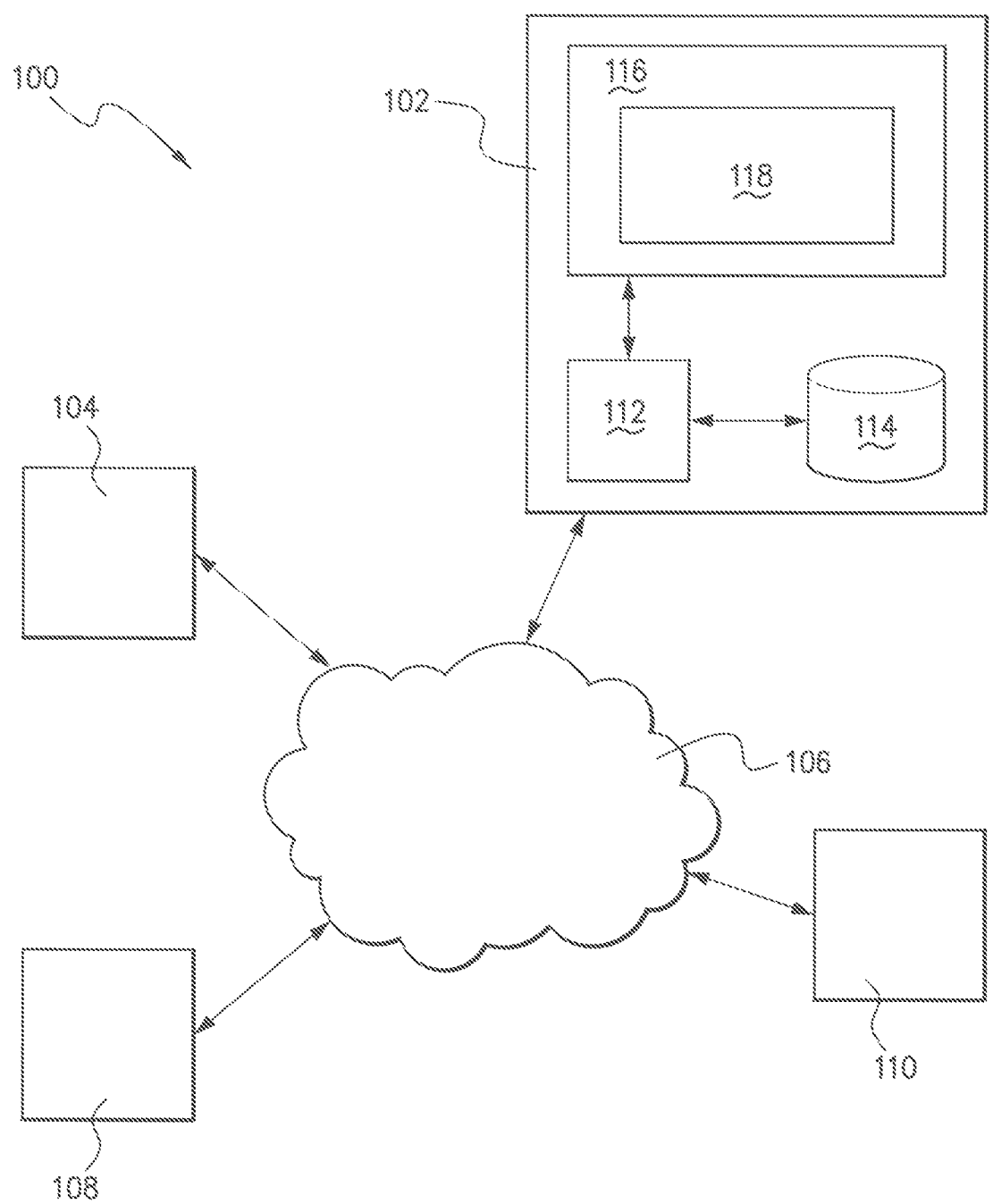
FIG. 1 shows a schematic block diagram of a system for improving recipient response rates to content presented via a data communications network to a plurality of recipients based upon recipient response data, in accordance with a preferred embodiment of the present invention.

FIG. 1 illustrates an exemplary system 100 in which preferred embodiments of the invention may be implemented. The system includes a server 102 and at least one user terminal 104, both of which are connected to a network 106, which may be, for example, the Internet. Also connected to the network 106 are a plurality of user terminals and/or servers, eg 108, 110. It will be appreciated that FIG.

1 depicts the system 100 schematically only, and is not intended to limit the technology employed in the servers, user terminals and/or communications links. The user terminals in particular may be wired or wireless devices, and their connections to the network may utilize various technologies and bandwidths. For example, applicable user terminals include (without limitation): PC's with wired (eg LAN, cable, ADSL, dial-up) or wireless (eg WLAN, cellular) connections; and wireless portable/handheld devices such as PDA's or mobile/cellular telephones. The protocols and interfaces between the user terminals and the servers may also vary according to available technologies, and include (again without limitation): wired TCP/IP (Internet) protocols; GPRS, WAP and/or 3G protocols (for handheld/cellular devices); Short Message Service (SMS) messaging for digital mobile/cellular devices; and/or proprietary communications protocols.

The server 102 includes at least one processor 112 as well as a database 114, which would typically be stored on a secondary storage device of the server 102, such as one or more hard disk drives. Server 102 further includes at least one storage medium 116, typically being a suitable type of memory, such as random access memory, for containing program instructions and transient data related to the operation of the search engine as well as other necessary functions of the server 102. In particular, the memory 116 contains a body of program instructions 118 implementing the method and system in accordance with preferred embodiments of the invention. The body of program instructions 118 includes instructions for improving recipient response rates to content presented via a data communications network, such as a web-based interface, to a plurality of recipients based upon recipient response data, the operation of which will be described hereafter.

It should be appreciated that the hardware used to implement the method of the invention may be conventional in nature or specifically designed for the purpose. The hardware structure shown in FIG. 1 is merely one possible embodiment and any other suitable structure may be utilised.

Preparation

Figures 2, 3:
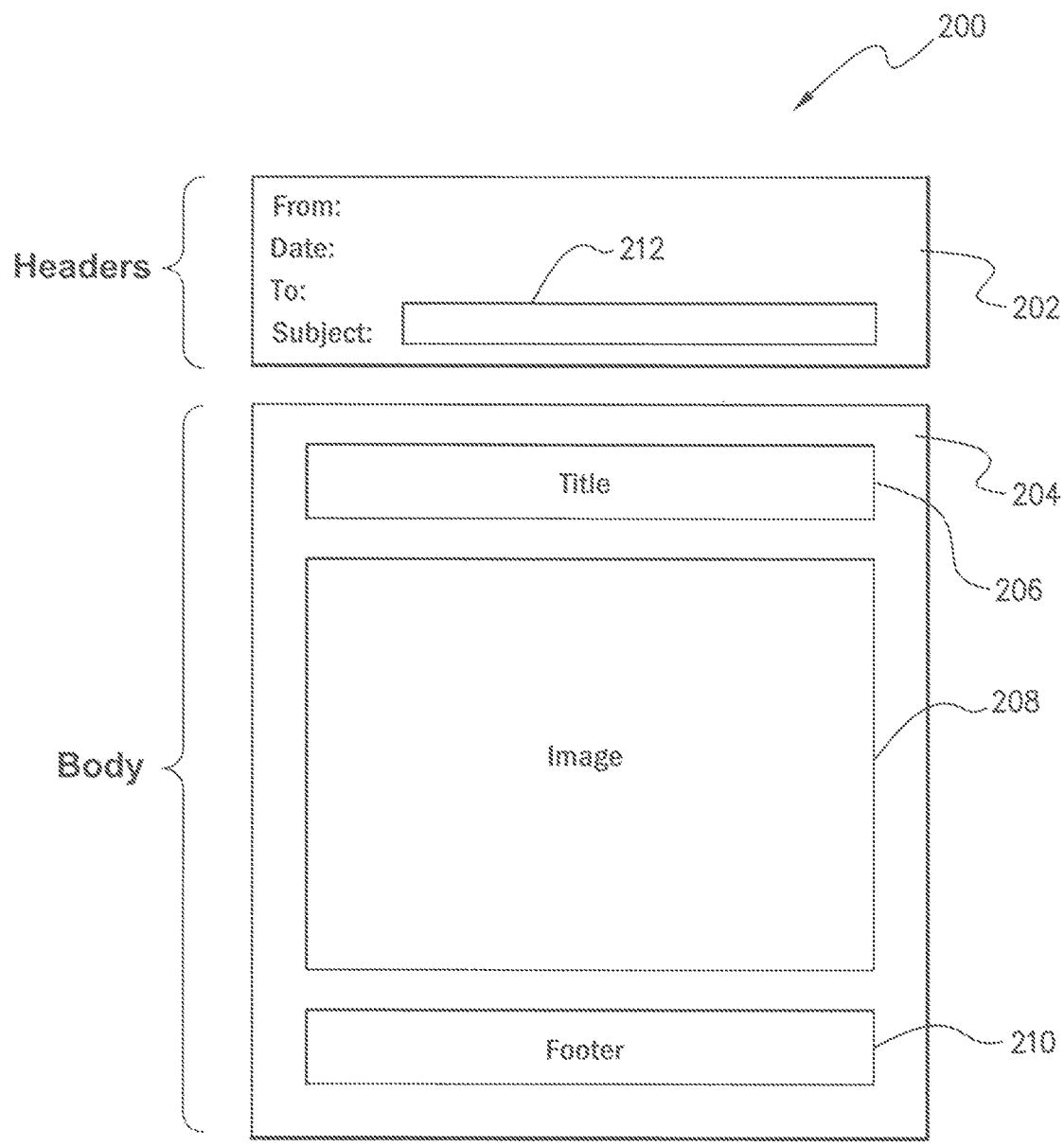
FIG. 2 illustrates the structure of a sample email message, according to an embodiment of the invention.
FIG. 3 is an example of content levels and content factors according to an embodiment of the invention.

FIG. 2 illustrates the structure of a sample email 200, representing content presented via a data communications network to a plurality of recipients in accordance with a preferred embodiment of the invention. Every email 200 contains two distinct sections:

1. a set of "headers" 202, which generally contain metadata such as the sender of an email, the time at which it was sent, the Internet Protocol (IP) address of the originating computer, the subject of the email etc; and 2. a "body" 204, which includes the content of the email message, expressed, for example, in plain text or as HTML.

A preferred embodiment of the present invention requires further subdivision of the email header 202 and body 204. For example, FIG. 2 illustrates the subdivision of the body into "Title" 206, "Image" 208 and "Footer" 210, whereas the header contains a "Subject" 212. Each of these subdivisions is modelled as a content factor, which contains one or more mutually exclusive content levels representing the alternatives available for the content factor. For example, the content levels for the "Image" content factor represent the various images which are available for use in the email.

The number of content factors and content levels is arbitrary, and freely selectable by the user in accordance with the logical structure of the email message itself. An example table 300 illustrating content levels and content factors is shown in FIG. 3. In this example, the content factors illustrated are "Subject", "Title", "Image" and "Footer". Corresponding to each of these content factors is at least one content level. The "Subject" content levels 302 shown in FIG. 3 are "Subject 1", "Subject 2" and "Subject 3", the "Title" content levels 304 shown are "Title 1" and "Title 2", the "Image" content levels 306 shown are "Image 1", "Image 2" and "Image 3", and the "Footer" content level 308 shown is "Footer 1".

Figure 4:
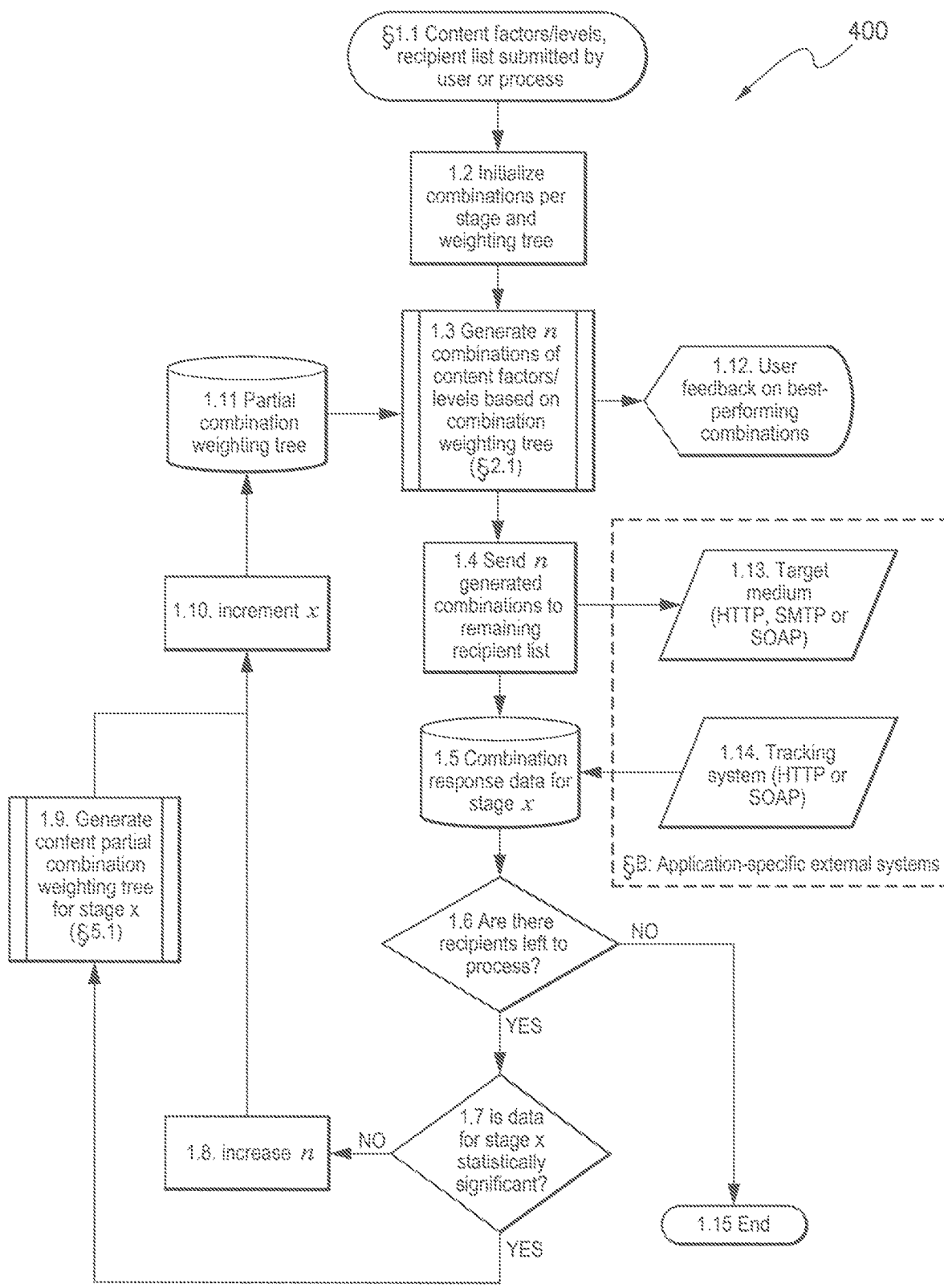
FIG. 4 is a flow chart illustrating a preferred method for improving recipient response rates to content presented via a data communications network to a plurality of recipients based upon recipient response data in accordance with the invention.
Figure 5:
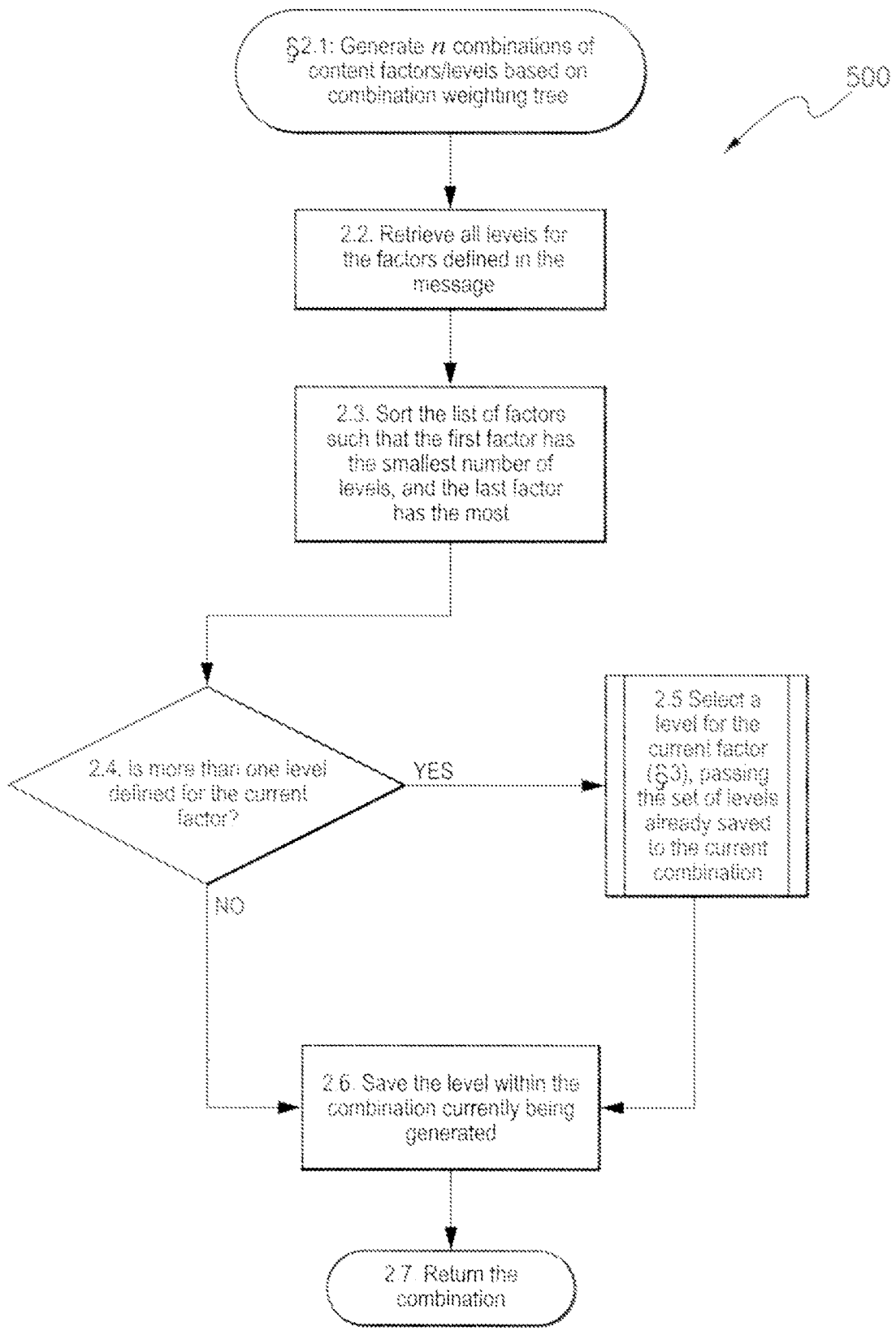
FIG. 5 is a flow chart illustrating the steps required to generate combinations of content factors and content levels in accordance with a preferred embodiment of the invention.
Figure 6:
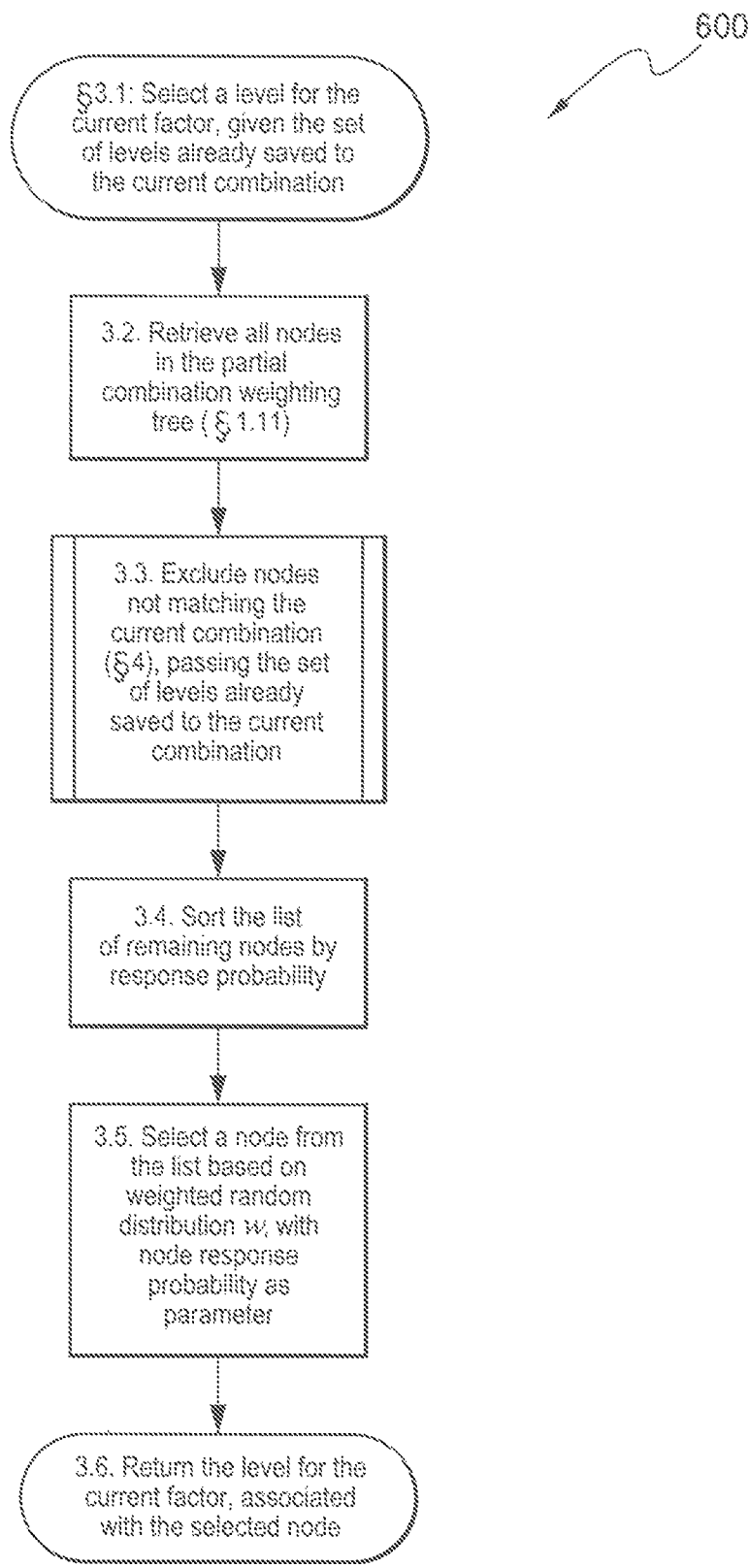
FIG. 6 is a flow chart illustrating the steps required to select a content level in accordance with a preferred embodiment of the invention.
Figure 7:
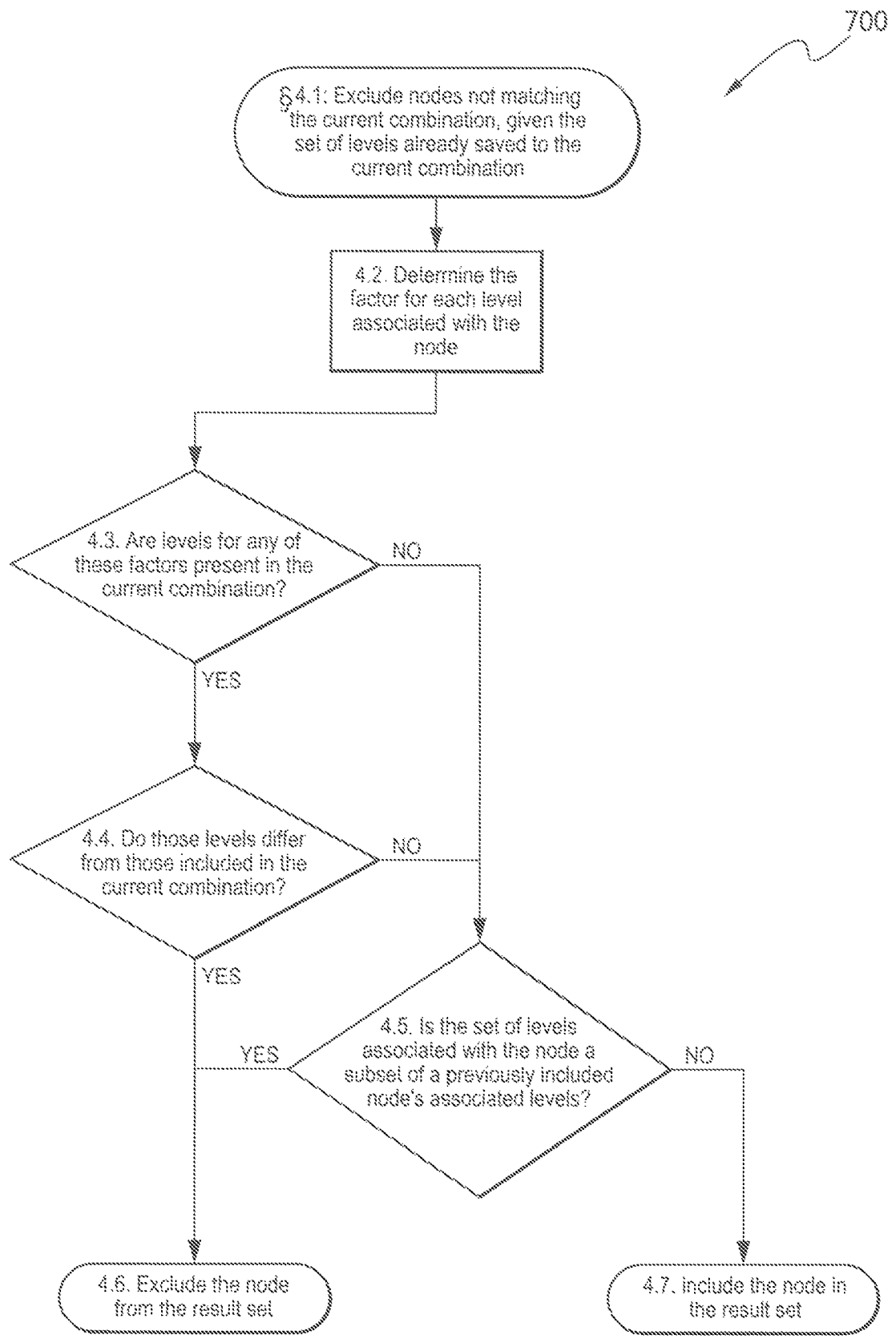
FIG. 7 is a flow chart illustrating the steps required to exclude nodes not matching the current combination of content levels in accordance with a preferred embodiment of the invention.
Figures 8, 9:
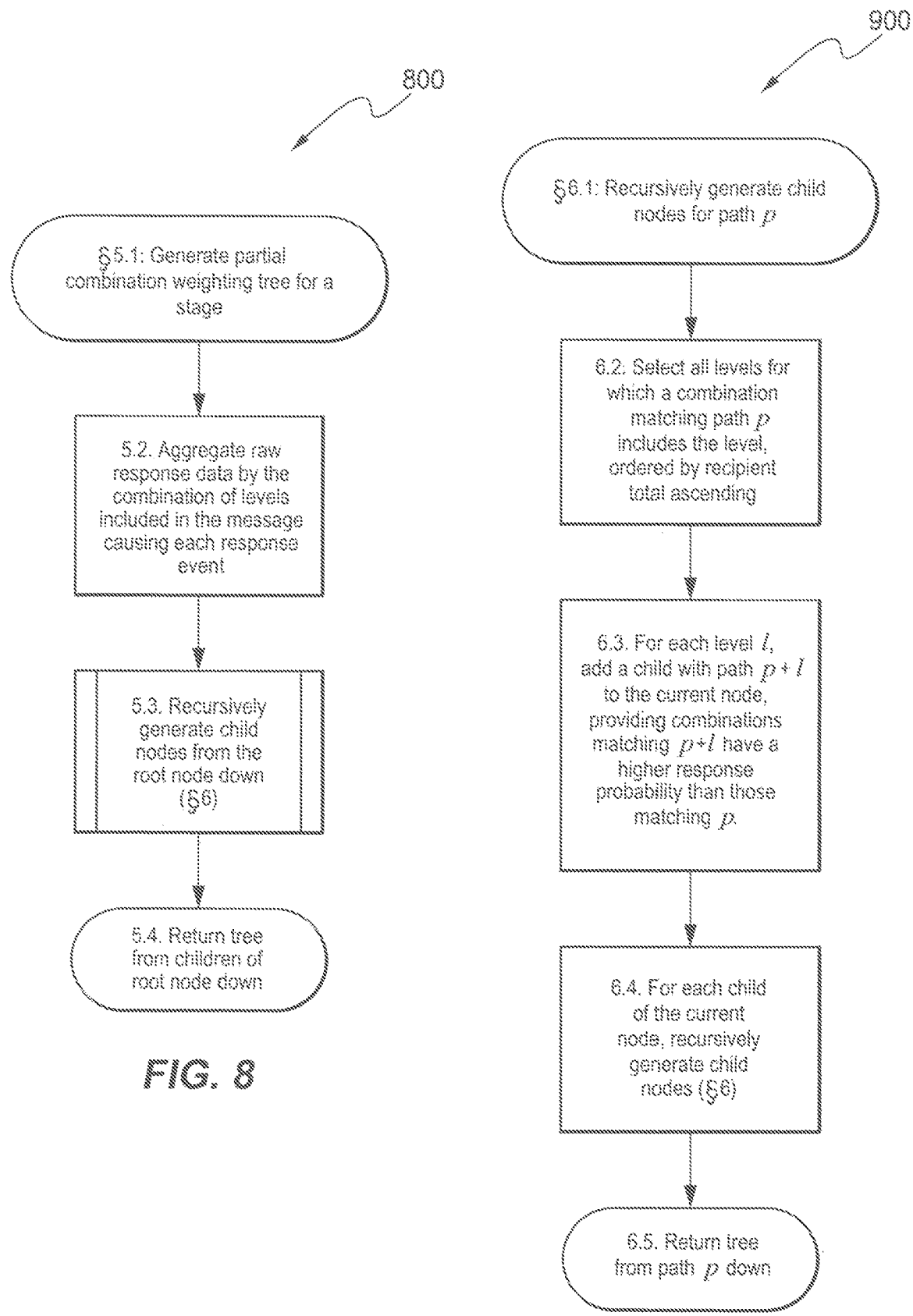
FIG. 8 is a flow chart illustrating the steps required to generate a partial combination weighting tree in accordance with a preferred embodiment of the invention.
FIG. 9 is a flow chart illustrating the steps required to recursively generate child nodes in accordance with a preferred embodiment of the invention.

FIGS. 4 to 9 are flow charts illustrating the steps in a method embodying the present invention. Briefly, FIG. 4 is a flow chart 400 which illustrates a preferred method for improving recipient response rates to content presented via a data communications network to a plurality of recipients based upon recipient response data, in accordance with the present invention. FIG. 5 is a flowchart 500 which illustrates the steps required by § 1.3 in flow chart 400. FIG. 6 is a flowchart 600 which illustrates the steps required by § 2.5 in flow chart 500. FIG. 7 is a flow chart 700 which illustrates the steps required by § 3.3 in flow chart 600. FIG. 8 is a flow chart 800 which illustrates the steps required by § 1.9 of flow chart 400. FIG. 9 is a flow chart 900 which illustrates the steps required by § 5.3 of flow chart 800. Further details will now be described with reference to the flow charts 400-900.

Broadcast: Stage 1

In accordance with the general method shown in flow chart 400, at § 1.1 an initial request is received to initiate an optimisation process based on the results of an email broadcast. At § 1.2, a tree structure is initialized containing nodes which represent the content factors (for example "Subject", "Title", "Image" and "Footer") to be tested. A determination is made as to the number of recipients (n) who should form part of each stage of the optimisation procedure based upon the desired statistical level of confidence of the results. In the first stage of the broadcast, a subset of the potential recipients are selected based on an initial estimate of the sample size required for reliable analysis. For an exemplary recipient database, an initial sample size of 10,000 is appropriate. Preferably, these recipients are selected from a pool of email subscribers. The following step, at § 1.3, requires the generation of n combinations of content levels to be delivered to the first n recipients, which make up the first stage of the optimisation process. Combinations of content levels are generated at random, with one content level (eg, one of "Subject 1", "Subject 2" or "Subject 3") being selected for each content factor (eg "Subject").

Figure 10:
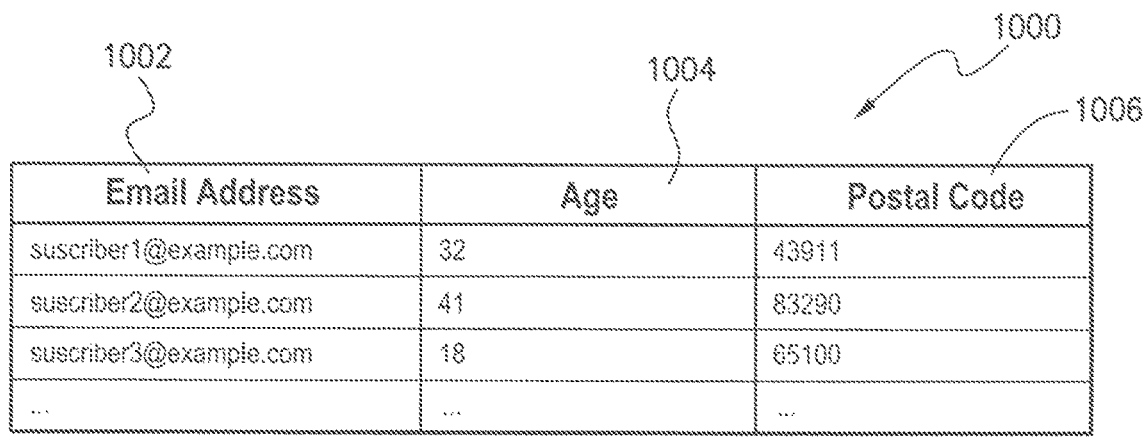
FIG. 10 is an example subscriber list according to an embodiment of the invention.

After the email structure is defined, and content factors and content levels are chosen (in accordance with § 1.1 and 1.2 of flow chart 400), then at § 1.4, the generated content is delivered to the n recipients in the form of an email message. The recipients' data is stored in a database as a series of records, each with an email address (or other unique identifier determining the destination of the message), and associated subscriber information (such as name, geographic location, or age). An example subscriber list 1000 is illustrated in FIG. 10. In this example, the information stored in the subscriber list includes "Email Address" 1002, "Age" 1004 and "Postal Code" 1006, although the actual information stored will depend largely on the demographics of the subscribers and the required outcomes of the optimisation process.

Figure 11:
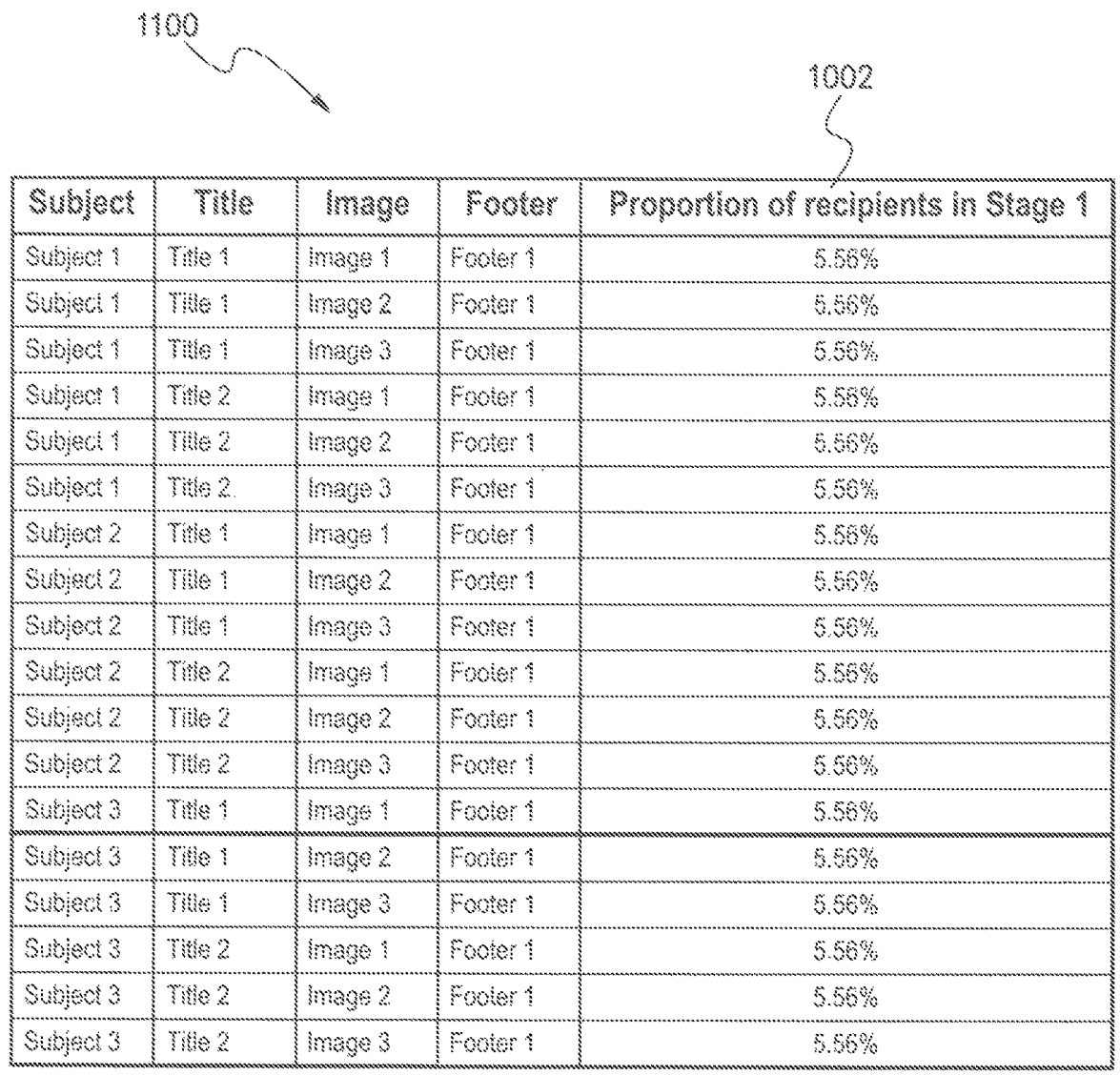
FIG. 11 is an example of a distribution of possible combinations of content levels in a first stage of testing, according to an embodiment of the invention.

Given a sufficiently large sample size, FIG. 11 illustrates the distribution of the possible combinations of content levels 1100. In this example the total number of possible combinations of content levels (eg all combinations of the "Subject", "Title", "Image" and "Footer" content levels) is 18. The distribution of each of these 18 combinations in the first stage is performed at random in accordance with a uniform probability distribution function, and the proportion of recipients 1102 to which each combination is sent is therefore approximately 1/18=5.56%. After an email message containing a combination of content levels is sent to a recipient, details of the combination are stored in a database and linked to the recipient's unique identifier.

Preferably, the delivery of content to recipients and the tracking of recipient responses, shown at § 1.13 and 1.14 in flow chart 400, is performed via an external system such as the SMTP or SOAP protocols. During this process, event data (such as email opens, newsletter subscriptions, product purchases, page views etc) are collected and aggregated, as indicated at § 1.5 of flow chart 400, based upon the content level combination sent to the recipient responsible for generating the event.

Analysis: Stage 1

As the first stage of the broadcast is sent, the unique identifier of recipients "responding" (i.e. performing a certain desired action) is recorded, in accordance with § 1.5 of flow chart 400. At § 1.6, a determination is made as to whether there is recipient response data which has not yet been analysed, and to ensure that an email message has been sent to all n recipients selected at the beginning of the stage. If there are no remaining recipients to process then the optimisation process is complete, § 1.15. Otherwise, a determination is made as to whether there is sufficient data available to begin the analysis phase of the process. An example of the output of this step is illustrated in FIG. 12. This example illustrates the recipient responses 1200 corresponding to the distribution in the first stage of the process. In particular, it shows the numbers of recipients 1202 that received a particular combination of content levels, and the number of recipient responses 1204 to a particular combination of content levels.

Because the number of responses is generally low, it is impossible to determine the best-performing combination of content levels with any degree of statistical confidence. Thus, in accordance with § 1.9 and 1.11 of flow chart 400, the algorithm aggregates recipient and response counts by content levels, yielding the results 1300 shown in FIG. 13. This example shows the response rate 1306 in stage 1 to each of the content levels, which represents the number of recipient responses 1304 to a particular content level as a percentage of the total number 1302 of recipients that received an email message containing that content level. For example, the results 1300 indicate that 3320 recipients received an email message containing the "Subject 1" content level, and only 105 of these recipients responded. Therefore, the response rate to the "Image 1" content level is 3.16%. In the results shown in FIG. 13, it is indicated that the response rate of the "Title 1" content level is 3.47% and the response rate of the "Image 3" content level is 3.49%. These are the two highest performing content levels, with respect to the average response rate of 3.14%.

The response rate information for the high performing content levels is then used to update the content tree structure, in accordance with § 1.9 of flow chart 400. The tree structure encodes the top-performing combinations of content levels, such that child nodes have higher response rates than their parents, as shown in FIG. 14. In the example structure 1400, the "Path to Tree Nodes" 1402 are listed with their corresponding recipient response rate 1404. The "<root>" node stores the overall average performance of all email messages in the broadcast, whereas for example, the "<root>/Title 1" node stores the performance of all email messages in the broadcast containing the "Title 1" content level. A more complex example is "<root>/Title 1/Image 3/Subject 1" (not shown), which represents a unique combination of "Subject", "Title" and "Image" content levels within the broadcast. As shown in FIG. 11, the "Footer 1" content level is used in every combination of content levels, as it is the only available content level for the "Footer" content factor, and therefore there is no requirement that this be encoded in the tree.

Considering flow chart 800, § 5.1 to 5.4 are the steps required by § 1.9 for generating a partial combination weighting tree for a stage of the optimisation process. At § 5.2, the response data generated by recipients in the stages since the previous analysis phase is aggregated by type (eg the particular response event) and the particular combination of content levels which produced the response. Then at § 5.3, child nodes are recursively generated, starting from the root node. Considering flow chart 900, § 6.1 to 6.5 are the steps required by § 5.3 for recursively generating child nodes. In steps § 6.2 to 6.3 of flow chart 900, the system generates tree nodes in a recursive fashion for every combination of content levels in distinct factors, provided that the given combination of content levels was received by more than a certain number of recipients (eg 1000 recipients, although this threshold is selected based on expected response rates and the desired confidence level), and the combination of content levels is no more specific than needed to identify a distinct set of linked levels (eg if certain content levels are required by external metadata to be sent to particular types of recipients). Each node contains the conditional probability of an event occurring per recipient for the content level that the node is concerned with, given that the recipient has also received each content level identified by the tree path from the root node to the node in question. At § 6.4, the extension of the tree structure is returned, and then at § 5.4 the entire length of the tree structure from the child nodes down to the root node is returned and stored in the database.

If it is determined, at § 1.7, that the data is not statistically significant then the number of recipients per stage (n) is increased, in accordance with § 1.8 and 1.10 in flow chart 400, the content combination weightings are updated in the tree structure (in accordance with § 1.11) and the process of generating and delivering content (ie § 1.3 to 1.6) is repeated until there is sufficient data to perform an analysis.

Broadcast: Stage 2

If the results of "Analysis: Stage 1" are inconclusive, the algorithm increases the sample size of future stages by a fixed amount, selectable by the user (in accordance with § 1.8 of flow chart 400). Otherwise, the sample size remains the same as in Stage 1, and the broadcast proceeds as outlined above in "Broadcast: Stage 1", except that the previously random composition of the email messages sent is modified to take into consideration the data stored in the tree structure, as shown in FIG. 14 (in accordance with § 1.10 of flow chart 400).

Considering the method shown in flow chart 500, § 2.1 to 2.7 are the steps performed in generating the n combinations of content levels, in accordance with § 1.3 of flow chart 400. Each email message, in the subsequent stages of the optimisation process, is generated factor-by-factor, starting with the content factor for which the fewest content levels are defined. The operation of the content level selection algorithm is described below.

At § 2.2 of flow chart 500, all available content levels are retrieved from the database.

Then at § 2.3, and beginning with the content factor with the fewest content levels (in the example, the "Title" content factor has the fewest number of content levels available), a ranked list of all content levels for that content factor are generated as follows:
  (i) In accordance with decision § 2.4, if there is more than one content level for the current content factor (§ 2.4), then the most specific content level performance tree nodes (as shown in FIG. 14) applicable to the current email message is retrieved in accordance with § 2.5 of flow chart 500. Considering flow chart 600, § 3.1 to 3.6 are the steps required by § 2.5 for selecting a level for the current content factor. At § 3.2, all nodes in the partial combination weighting tree structure are retrieved. Then at § 3.3, it is necessary to exclude nodes not matching the current combination of content levels selected. Considering flow chart 700, § 4.1 to 4.6 or 4.7, are the steps required by § 3.3 to exclude nodes that do not match the current combination of content levels.
  At § 4.2, it is necessary to determine the content factor for each content level associated with the current node. In accordance with decision § 4.3, if there are no content levels for any of these content factors present in the current combination, then specificity is determined by the number of levels in the "Path to Tree Node" that match the set of content levels already selected for inclusion in the email message, in accordance with § 4.4 and 4.5 of flow chart 500. If a node contains a content level that contradicts a selection already made for the current email message (because the respective content factor for that content level has already been processed for the current email message, and a different content level selected), the node is removed from consideration at § 4.6. Otherwise, the node is included in the result set at § 4.7. In the example, content level "Title 1" would be selected as the content level for the "Title" content factor, and "Image 3" would be selected as the content level for the "Image" content factor. No content level would be selected for the "Subject" content factor, as no content levels are present for this content factor in the level performance tree.
  (ii) At § 3.4 of flow chart 600, the list of tree nodes is sorted by descending response rate, and the content level specified for the current content factor is extracted from each of the retrieved tree nodes and returned at § 3.6. In accordance with § 3.5 of flow chart 600, this selection is based upon a weighted random distribution with the node response probability as a parameter.
  (iii) Any content levels for the current content factor available but not already retrieved are appended to the list. Given the example selections outlined above at (i), content level "Title 2" would be appended to the list for the "Title" content factor, content levels "Image 1" and "Image 2" would be appended to the list for the "Image" content factor, and content levels "Subject 1", "Subject 2" and "Subject 3" would be appended to the list for the "Subject" content factor.

A content level is selected from the ranked list of content levels (in accordance with § 2.5 of flow chart 500), and inserted into the email message in the location defined for the current content factor, in accordance with § 2.6 and 2.7 of flow chart 500. The content level selected is determined statistically, with each content level having a probability of selection defined by a weighting function taking as parameters the rank of the content level, and the recipient count and response rate stored in the relevant tree node. In the exemplary implementation, the weighting function is $$w = \frac{(1 - a_n)}{\sum_{i=0}^{i=k} (1 - a_i)}$$

where $a_n$ is the probability that the response rate of content level n is greater than the average response rate (based on standard statistical confidence tests, for example assuming a normal distribution) or 0.5 in the case of a content level not extracted from the performance tree, and k is the number of content levels in the ranked list 1502. An example of the list generated for the "Image" content factor 1500 in Steps 1 and 2 above, along with the probability of selection 1504 of each content level as determined by the above weighting function is illustrated in FIG. 15. In this example, the "Image 3" content level is ranked first as it has a probability of selection of 0.44, which is greater than that of the "Image 1" and "Image 2" content levels, which both have a probability of selection of 0.28.

Steps § 2.3 through 2.7 above are repeated until a content level has been selected for each content factor defined for the current email message (in accordance with § 1.3 of flow chart 400). Once an email message has been generated, it is sent to the designated recipient in accordance with § 1.4 of flow chart 400. Based on the example data, the distribution of combinations of content levels in a Stage 2 broadcast is illustrated in FIG. 16. The example 1600 shows the proportion of recipients to which combinations of content levels will be distributed, as with FIG. 11, although unlike Stage 1, the distributions in Stage 2 are no longer uniform due to the adjusted combination weightings. All combinations of content levels containing the "Image 3" and "Title 1" content levels (ie "Subject 1, Title 1, Image 3, Footer 1", "Subject 2, Title 1, Image 3, Footer 1" and "Subject 3, Title 1, Image 3, Footer 1") are distributed to 9.24% of recipients, which is the highest proportion of the possible combinations. This is because the "Image 3" and Title 1" content levels are the highest-performing content levels.

Analysis: Stage 2

The analysis at Stage 2 proceeds as described in "Analysis: Stage 1" above. Considering that the distribution of email messages is weighted towards combinations including high-performing content levels, exemplary results 1700 of the first analysis step of Stage 2 are shown in FIG. 17. This example is generated by repeating the analysis, the results 1200 of which are shown in FIG. 12, and shows the recipient responses 1700 corresponding to the distribution in the first stage of the process. In particular, the example shows the numbers of recipients 1702 that received a particular combination of content levels, and the number of recipient responses 1704 to a particular combination of content levels in Stage 2 of the process. The algorithm then aggregates recipient response data by content level, as previously in "Analysis: Stage 1", the results 1300 of which are illustrated in FIG. 13. The corresponding results 1800 of aggregating the recipient response data shown in FIG. 17 are illustrated in FIG. 18. This example shows the response rate 1806 in stage 2 to each of the content levels, which represents the number of recipient responses 1804 to a particular content level as a percentage of the total number of recipients that received an email message containing that content level 1802.

In addition, the non-uniform distribution of recipient response data (weighted towards combinations including successful content levels) enables deeper analysis of higher-performing combinations of content levels. In addition to analysis by content level, there may be enough data for analysis by pairs of content levels. The results 1900 of aggregating the recipient response data by pairs of content levels are illustrated in FIG. 19. Based on the recipient response data in FIG. 19, the average response rate is 3.30%. Content level pair "Image 3, Title 1" has a response rate of 4.12%, and content level pair "Subject 3, Image 3" has a response rate of 3.93%. Only these two content level pairs ("Image 3, Title 1" and "Subject 3, Image 3") have recipient response rates exceeding the average response rate by a significant margin. The margin may be predetermined by the user and can be increased or decreased depending on the results obtained during the optimisation process. The content level performance tree structure 2000 for this data set, generated as in Stage 1, is illustrated in FIG. 20. The tree structure 2000 encodes the top-performing combinations of content levels and content level pairs, such that child nodes have higher response rates than their parents. In the example shown in FIG. 20, the "Path to Tree Nodes" 2002 are listed with their corresponding recipient response rate 2004. The example indicates that the "<root>/Image 3/Title 1" node stores the performance (ie 4.12% response rate) of all email messages in the broadcast containing the "Image 3, Title 1" content level pair. Similarly, the "<root>/Image 3/Subject 3" node stores the performance (ie 3.93% response rate) of all email messages in the broadcast containing the "Image 3, Subject 3" content level pair.

Broadcast & Analysis: Subsequent Stages

The broadcast and analysis algorithm operates as described in Stage 2 above for each subsequent stage, until an email message has been delivered to each recipient within the customer database. If there are no longer any recipients left to process (§ 1.6 of flow chart 400, as previously discussed) then the optimisation process ends (§ 1.15).

At each stage, high-performing combinations of content levels are identified with greater certainty, and a larger proportion of messages are generated which include such combinations. Accordingly, improvements in recipient response rates may be achieved by ongoing dynamic adaptation of messages which focuses upon combinations found to be statistically more likely to produce desired responses.

It will be understood that while preferred embodiments of the invention have been described herein, these should not be considered to limit the scope of the invention, which is defined by the claims appended hereto.

I claim:

1. A method for improving recipient response rates to SMS message or email content transmitted via a data communications network to a plurality of recipients, the method comprising the steps of:
    a) storing in one or more computer-readable data storage media content comprising a plurality of content levels;
    b) storing in the one or more computer-readable data storage media a weighting value for each of the content levels;
    c) generating by at least one computer a plurality of SMS message or email content samples by forming combinations of content levels for a plurality of content factors, the SMS message or email content samples being configured for inducing a recipient to generate an event representing a response;
    d) for each SMS message or email content sample of the plurality of SMS message or email content samples, the at least one computer calculating a combination weighting value from the stored weighting values corresponding with the content levels comprising the SMS message or email content sample;
    e) selecting, by the at least one computer, a subset of the plurality of recipients and transmitting, by the at least one computer, to each member of the subset only one of the plurality of SMS message or email content samples, the one SMS message or email content sample being selected according to the combination weighting values;
    f) receiving, by the at least one computer, one or more recipient responses via the data communications network from one or more recipients of the subset, wherein each recipient response is a request according to one or more of the group consisting of: HTTP, SMTP, and SOAP;
    g) analyzing, by the at least one computer, the one or more recipient responses by computing for each SMS message or email content sample a response rate, wherein each response rate is a ratio between a number of recipients of the corresponding SMS message or email content sample and a number of recipient responses to the corresponding content sample to identify one or more combinations of content levels resulting in high recipient response rates relative to other combinations in accordance with predetermined statistical criteria;
    h) adjusting, by the at least one computer, the weighting values in the one or more data storage media such that the, or each, combination of content levels resulting in high recipient response rate has an increased probability of subsequent selection, and storing the adjusted weighting values within the one or more data storage media; and
    i) repeating at least steps d) and e) utilizing the adjusted weighting values to increase the probability of receiving recipient responses.

2. The method of claim 1 wherein the step (g) comprises analyzing the recipient responses to calculate for each one of a plurality of combinations of content levels a corresponding probability that a recipient response rate to said combination of content levels is greater than the average response rate for all combinations of content levels.

3. The method of claim 1 which includes repeating the steps d) to h) so as to further improve recipient response rates.

4. The method of claim 1 wherein the step (c) of generating content samples comprises a step of ranking the content factors based upon a number of content levels corresponding with each content factor.

5. The method of claim 1 wherein the step (c) of generating content samples comprises forming a full factorial of combinations of content levels for the plurality of content factors.

6. The method of claim 1 comprising storing the recipient response data and the weighting values in a data structure stored in the one or more storage media, wherein the data structure comprises a tree structure.

7. The method of claim 6 wherein the tree structure comprises:
    a root node for containing recipient response data corresponding with all content samples presented to recipients; and
    zero or more leaf nodes for containing recipient response data corresponding with content samples presented to recipients which comprise particular content levels and/or combinations of content levels.

8. The method of claim 7 wherein the step (c) of generating content samples comprises the steps of:

deriving from the tree structure partial combinations of content levels based upon a number of content levels comprising each content factor;

filtering out partial combinations of content levels based upon the content levels already selected for the plurality of content factors;

filtering out partial combinations of content levels for which more extended combinations of content levels exist; and selecting partial combinations of content levels based upon a weighted random distribution with the combination weightings as a parameter.

9. The method of claim 1 wherein the step (g) of analyzing the recipient responses comprises the steps of:

retrieving recipient response data from the data structure and aggregating said recipient response data based upon combinations of content levels; and forming extended combinations of content levels for those combinations of content levels which have resulted in high recipient response rates relative to other combinations.

10. The method of claim 7 wherein the step (g) of analyzing the recipient responses comprises the steps of:

retrieving recipient response data from the data structure and aggregating said recipient response data based upon combinations of content levels; forming extended combinations of content levels for those combinations of content levels which have resulted in high recipient response rates relative to other combinations; and generating leaf nodes of said tree structure for containing recipient response data corresponding with content samples presented to recipients in a recursive manner for said extended combinations of content levels.

11. The method of claim 1 wherein each combination weighting value (w) is computed based upon a probability that a recipient response rate to the corresponding combination of content levels is greater than an average recipient response rate for all combinations of content levels ($a_n$) and the number of content levels comprising each content factor (k), according to the formula:

$$w = \frac{(1 - a_n)}{\sum\limits_{i=0}^{i=k} (1 - a_i)}.$$

12. A non-transitory computer-readable medium having computer-executable instructions stored thereon for performing a method for improving recipient response rates to SMS message or email content transmitted via a data communications network to a plurality of recipients, the method comprising the steps of:

a) storing in one or more computer-readable data storage media content comprising a plurality of content levels;

b) storing in the one or more computer-readable data storage media a weighting value for each of the content levels;

c) generating a plurality of SMS message or email content samples by forming combinations of content levels for a plurality of content factors, the SMS message or email content samples being configured for inducing a recipient to generate an event representing a response;

d) for each SMS message or email content sample of the plurality of SMS message or email content samples, calculating a combination weighting value from the stored weighting values corresponding with the content levels comprising the SMS message or email content sample;

e) selecting a subset of the plurality of recipients and transmitting to each member of the subset only one of the plurality of SMS message or email content samples, the one SMS message or email content sample being selected according to combination weighting values;

f) receiving one or more recipient responses via the data communications network from one or more recipients of the subset, wherein each recipient response is a request according to one or more of the group consisting of: HTTP, SMTP, and SOAP;

g) analyzing the one or more recipient responses by computing for each SMS message or email content sample a response rate, wherein each response rate is a ratio between a number of recipients of the corresponding SMS message or email content sample and a number of recipient responses to the corresponding content sample to identify one or more combinations of content levels resulting in high recipient response rates relative to other combinations in accordance with predetermined statistical criteria;

h) adjusting the weighting values in the one or more data storage media such that the, or each, combination of content levels resulting in high recipient response rate has an increased probability of subsequent selection, and storing the adjusted weighting values within the one or more data storage media; and i) repeating at least steps d) and e) utilizing the adjusted weighting values to increase the probability of receiving recipient responses.

13. A system for improving recipient response rates to SMS message or email content transmitted via a data communications network to a plurality of recipients, the system comprising at least one computer and one or more computer-readable storage media, wherein:

a) the one or more storage media includes a data structure in which can be stored recipient response data associated with content comprising corresponding combinations of content levels;

b) the at least one computer is configured to store in the data structure in the one or more storage media a weighting value for each of the content levels;

c) the at least one computer is configured to generate a plurality of SMS message or email content samples by forming combinations of content levels for a plurality of content factors, the SMS message or email content samples being configured for inducing a recipient to generate an event representing a response;

d) the at least one computer is configured to calculate, for each SMS message or email content sample of the plurality of SMS message or email content samples, a combination weighting value from the stored weighting values corresponding with the content levels comprising the SMS message or email content sample;

e) the at least one computer is configured to select a subset of the plurality of recipients and transmit to each member of the subset only one of the plurality of SMS message or email content samples, the one SMS message or email content sample being selected according to the combination weighting values;

f) the at least one computer is configured to receive one or more recipient responses via the data communications network from one or more recipients of the subset, wherein each recipient response is a request according to one or more of the group consisting of: HTTP, SMTP, and SOAP;

g) the at least one computer is configured to analyze the recipient responses by computing for each SMS message or email content sample a response rate, wherein each response rate is a ratio between a number of recipients of the corresponding SMS message or email content sample and a number of recipient responses to the corresponding content sample, to identify one or more combinations of content levels resulting in high recipient response rates relative to other combinations in accordance with predetermined statistical criteria;

h) the at least one computer is configured to adjust the weighting values in the data structure in the one or more data storage media such that the, or each, combination of content levels resulting in high recipient response rate has an increased probability of subsequent selection, and store the adjusted weighting values within the data structure in the one or more storage media, to increase the probability of receiving recipient responses upon subsequent repetition of at least steps d) and e).

14. A computer-implemented system for improving recipient response rates to SMS message or email content transmitted via a data communications network to a plurality of recipients, the system comprising one or more computers comprising:

at least one processor;

an interface between said processor and the data communications network; and one or more computer-readable storage media operatively coupled to the processor comprising a data structure for containing recipient response data associated with content comprising corresponding combinations of content levels, and a weighting value associated with each one of the content levels, wherein the storage media further comprises program instructions for execution by the processor, said program instructions causing the processor to execute the steps of:

a) generating a plurality of SMS message or email content samples by forming combinations of content levels for a plurality of content factors in accordance with respective combination weightings derived from recipient response data contained within the data structure;

b) for each SMS message or email content sample of the plurality of SMS message or email content samples, the at least one computer calculating a combination weighting value from the stored weighting values corresponding with the content levels comprising the SMS message or email content sample;

c) selecting a subset of the plurality of recipients and transmitting to each member of the subset only one of the plurality of SMS message or email content samples, the one SMS message or email sample being selected according to the combination weighting values;

d) receiving one or more recipient responses via the data communications network from one or more recipients of the subset, wherein each recipient response is a request according to one or more of the group consisting of: HTTP, SMTP, and SOAP;

e) analyzing the recipient responses by computing for each SMS message or email content sample a response rate, wherein each response rate is a ratio between a number of recipients of the corresponding SMS message or email content sample and a number of recipient responses to the corresponding content sample to identify one or more combinations of content levels resulting in high recipient response rates relative to other combinations in accordance with predetermined statistical criteria;

f) adjusting the weighting values in the one or more data storage media such that the, or each, combination of content levels resulting in high recipient response rate has an increased probability of subsequent selection, and storing the adjusted weighting values within the data structure in the one or more storage media; and g) repeating at least steps b) and c) utilizing the adjusted weighting values to increase the probability of receiving recipient responses.

15. The system of claim 14 wherein the data structure comprises a tree structure.

16. The system of claim 15 wherein the tree structure comprises:

a root node for containing recipient response data corresponding with all content samples presented to recipients; and zero or more leaf nodes for containing recipient response data corresponding with content samples presented to recipients which comprise particular content levels and/or combinations of content levels.

17. The system of claim 16 wherein said program instructions cause the processor, in the step (a) of generating content samples, to execute the steps of:

deriving from the tree structure partial combinations of content levels based upon a number of content levels comprising each content factor;

filtering out partial combinations of content levels based upon the content levels already selected for the plurality of content factors;

filtering out partial combinations of content levels for which more extended combinations on content levels exist; and selecting partial combinations of content levels based upon a weighted random distribution with the combination weightings as a parameter.

18. The system of claim 14 wherein said program instructions cause the processor, in the step (d) of analysing the recipient responses, to execute the steps of:

aggregating candidate response data based upon combinations of content levels and response type;

generating extended combinations of content levels based upon the number of content levels available to a candidate and the probability of positive candidate responses to a content combination.

19. The system of claim 14 wherein said program instructions cause the processor to compute each combination weighting (w) based upon a probability that a recipient response rate to the corresponding combination of content levels is greater than an average recipient response rate for all combinations of content levels ($a_n$) and the number of content levels comprising each content factor (k), according to the formula:

$$w = \frac{(1 - a_n)}{\sum_{i=0}^{i=k} (1 - a_i)}.$$

20. The computer-implemented system of claim 14, wherein the program instructions comprise program instructions causing the computer to execute the steps of:
- subsequent to step e) and prior to step g), determining according to one or more predetermined statistical criteria that the analyzing in step g) has failed to yield statistically significant data; and
- consequent to the determining, using in step g) a subset of the plurality of recipients that is relatively larger than the subset used in the prior step c).

21. The tangible computer-readable medium of claim 12, wherein the method comprises:
- subsequent to step g) and prior to step i), determining according to one or more predetermined statistical criteria that the analyzing in step g) has failed to yield statistically significant data; and
- consequent to the determining, using in step i) a subset of the plurality of recipients that is relatively larger than the subset used in the prior step e).

22. The method of claim 1, comprising:
- subsequent to step g) and prior to step i), determining according to one or more predetermined statistical criteria that the analyzing in step g) has failed to yield statistically significant data; and
- consequent to the determining, using in step i) a subset of the plurality of recipients that is relatively larger than the subset used in the prior step e).

\* \* \* \* \*